Patented June 26, 1934

1,964,682

UNITED STATES PATENT OFFICE 1,964,682

PIGMENT

Joseph W. Ayers, Easton, Pa., assignor to C. K. Williams & Company, Easton, Pa., a corporation of Pennsylvania No Drawing. Application July 12, 1932, Serial No. 622,110

3 Claims. (Cl. 134—59)

This invention relates to pigments and particularly yellow and red oxides of iron.

The hydrated oxides of iron have heretofore been produced by several different methods of precipitation from solutions of salts such as sulphates and chlorides of iron in which an excess of such salts are treated with suitable basic precipitants. These iron hydrates and the calcined products thereof have been used respectively as yellow and red pigments in rubber compounds in oil compositions for paints, linoleum, etc., and in clay dispersions.

It has been discovered that these pigments as heretofore produced are responsible for vulcanization-retarding and aging reactions in rubber compounds, for erratic action respecting the drying of oil compositions and for flocculation of clay in water dispersions. These pigments also fade or discolor in all of these compositions due to the action of light and also apparently due to oxidation or other reactions by action of the atmosphere.

The present inventor has discovered that the undesirable characteristics of these pigments may be overcome by treating the yellow precipitates constituting the final products of the various wet processes of producing iron hydrates with basic and preferably alkaline materials such as sodium carbonate, sodium, potassium, or magnesium hydroxides, ammonia, etc. By such treatments the present inventor has found that the dispersion characteristics of these pigments in rubber compounding have been greatly improved as have the wettability and ease of grinding in oil compositions.

The deleterious effects in rubber, paints, or clay dispersion compositions of these pigments are not entirely understood, but are believed to be due to occlusion to these pigments, no matter how carefully washed in commercial production, of certain deleterious iron or other compounds which cause fading under the action of light or atmosphere or both; which cause comparatively rapid deterioration of vulcanized rubber; which retard vulcanization; which prevent effective control of the drying characteristics of oil compositions and which cause the undesirable flocculation of clay in water dispersions.

The treatment of the hydrated oxides of iron is carried out by taking the final yellow pigment resulting from any of the prior art wet processes and after the usual washing previously referred to and treating it with the basic material. This treatment may be carried out by adding a solution of the basic material thereto and bringing said solution to the boiling point, preferably at atmospheric pressure, by allowing the pigment to age in a solution of the basic material for a substantial period, for example, twelve hours, or by spraying the filter cake of the material with the basic solution.

Alkaline-earth materials of basic reaction such as alkaline-earth hydroxides or carbonates may be employed for this treatment instead of the alkaline materials. These, however, are not so desirable since they apparently produce insoluble precipitates of the impurities occluded to the pigment which adulterate the color to some extent. It is understood that the term "alkaline" as used in the appended claims is used in its wider sense as denoting basic materials of substantial strength and not only strictly alkaline materials but also the alkaline-earth materials have the required basicity.

This is a companion case to applicant's co-pending application Serial No. 622,112, filed July 12, 1932, and containing any claim or claims which are generic to the specific inventions disclosed in the respective applications.

Modifications of the invention may be resorted to without departing from the spirit thereof or the scope of the appended claims.

What is claimed is:—

1. Pigment particles comprising a hydrate of iron produced by precipitation from a solution of an iron salt and freed from all but traces of water soluble constituents by a thorough washing and containing traces only of compounds adhering to the surfaces of the particles, which compounds are the result of the reaction of an alkaline material with the traces of constituents occluded on the surfaces of the particles after the precipitation and washing process, said particles being capable of effective dispersion in compositions such as rubber, paint, linoleum, clay dispersions or the like, and being highly resistant to fading under the action of light.

2. Pigment particles as set forth in claim 1, said alkaline material being present in excess on said particles.

3. Pigment particles as set forth in claim 1, said alkaline material comprising sodium carbonate.

JOSEPH W. AYERS.